(12) United States Patent
Tsuzuki

(10) Patent No.: US 8,850,564 B2
(45) Date of Patent: *Sep. 30, 2014

(54) PRINTING SYSTEM AND IMAGE FORMING APPARATUS

(71) Applicant: Oki Data Corporation, Tokyo (JP)

(72) Inventor: Hiroyuki Tsuzuki, Fukushima-ken (JP)

(73) Assignee: Oki Data Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/723,672

(22) Filed: Dec. 21, 2012

(65) Prior Publication Data

US 2013/0114111 A1 May 9, 2013

Related U.S. Application Data

(63) Continuation of application No. 11/802,674, filed on May 24, 2007, now Pat. No. 8,347,379.

(30) Foreign Application Priority Data

May 26, 2006 (JP) ................................ 2006-147071

(51) Int. Cl.
| | | |
|---|---|---|
| *G06F 21/00* | (2013.01) | |
| *H04L 29/06* | (2006.01) | |
| *G06F 21/60* | (2013.01) | |
| *G06K 19/10* | (2006.01) | |
| *G06K 15/02* | (2006.01) | |

(52) U.S. Cl.
CPC .............. *G06K 15/02* (2013.01); *G06F 21/608* (2013.01); *G06F 2221/2153* (2013.01)
USPC ................... 726/21; 726/3; 713/193; 705/51; 455/556.1; 399/79; 382/100; 358/1.14; 358/1.15; 358/3.28

(58) Field of Classification Search
USPC ........ 726/21, 3; 705/51; 713/193; 455/556.1; 399/79; 382/100; 358/1.14, 1.15, 3.28
See application file for complete search history.

(56) References Cited

U.S. PATENT DOCUMENTS

| | | | |
|---|---|---|---|
| 6,151,464 A | 11/2000 | Nakamura et al. | |
| 2005/0168769 A1* | 8/2005 | Kim et al. ................. | 358/1.14 |

(Continued)

FOREIGN PATENT DOCUMENTS

| | | | |
|---|---|---|---|
| GB | 2454211 A | | 5/2009 |
| JP | 2004-260273 | | 9/2004 |
| JP | 2013077210 A | * | 4/2013 |

OTHER PUBLICATIONS

Madane, A.R.; "Watermark Image Recognition from Local Scale-Invariant Feature"; Computer Modelling and Simulation, 2009. UKSIM '09. 11th International Conference on Digital Object Identifier: 10.1109/UKSIM.2009.63; Publication Year: Jul. 2009; pp. 258-263.*

(Continued)

*Primary Examiner* — Kambiz Zand
*Assistant Examiner* — Courtney Fields
(74) *Attorney, Agent, or Firm* — Rabin & Berdo, P.C.

(57) ABSTRACT

A printing system includes an image forming apparatus and a host terminal apparatus. The image forming apparatus is operated by a first user who picks up a printed output of the image forming apparatus. A second user sends print data from the host terminal apparatus. The image forming apparatus includes an input section, a receiving buffer, and a watermark embedding section. The first user inputs a first item of information indicative of the first user through the input section. The receiving buffer stores the print data therein. The watermark embedding section produces a watermark pattern in which information representative of the first item of information is embedded, and combines the print data with the watermark pattern. The image forming apparatus prints out the received print data with the watermark pattern embedded therein. The watermark pattern includes the first item of information therein.

10 Claims, 13 Drawing Sheets

(56) References Cited

U.S. PATENT DOCUMENTS

| | | |
|---|---|---|
| 2006/0001899 A1* | 1/2006 | Kanno ................ 358/1.14 |
| 2006/0078159 A1 | 4/2006 | Hamatake et al. |
| 2006/0092453 A1* | 5/2006 | Okada et al. ............ 358/1.14 |
| 2010/0009714 A1 | 1/2010 | McKinley et al. |

OTHER PUBLICATIONS

Yamada, T.; Fujii, Y.; Echizen, I.; Tanimoto, K.; Tezuka, S.; "Print traceability systems framework using digital watermarks for binary images"; Systems, Man and Cybernetics, 2004 IEEE International Conference on vol. 4; Digital Object Identifier: 10.1109/ICSMC.2004.1400847; Publication Year: Jul. 2004, pp. 3285-3290.

* cited by examiner

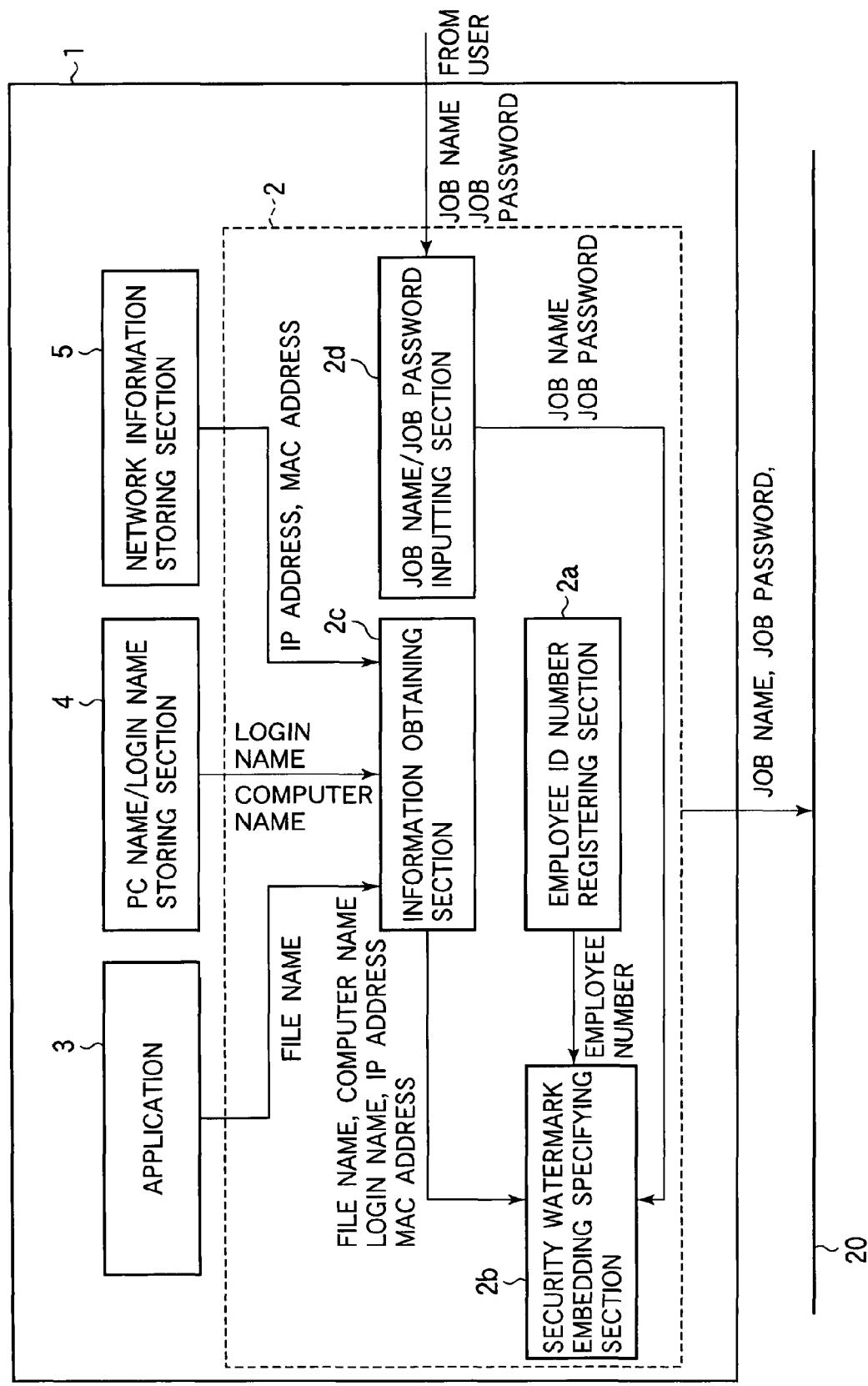

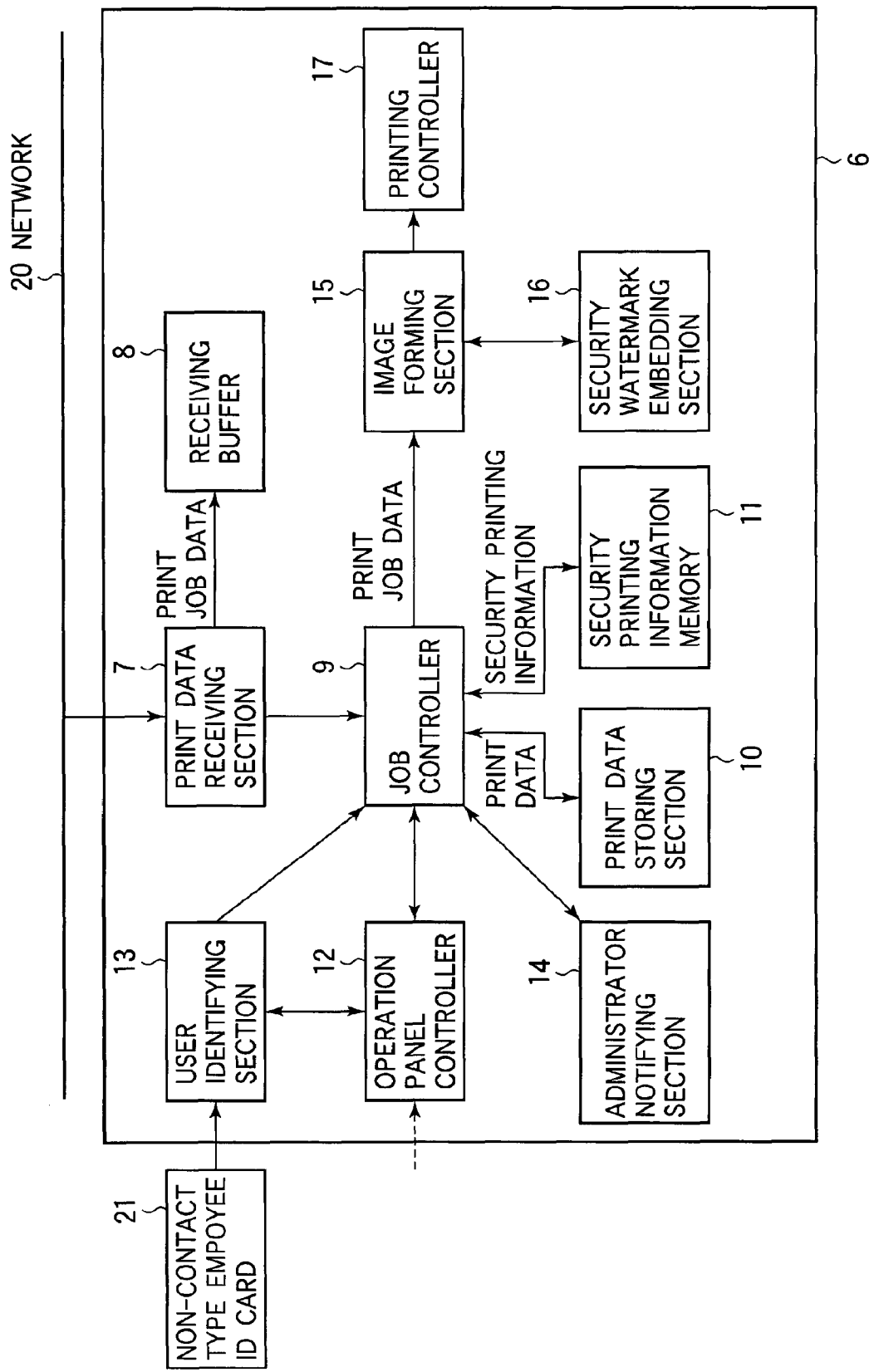

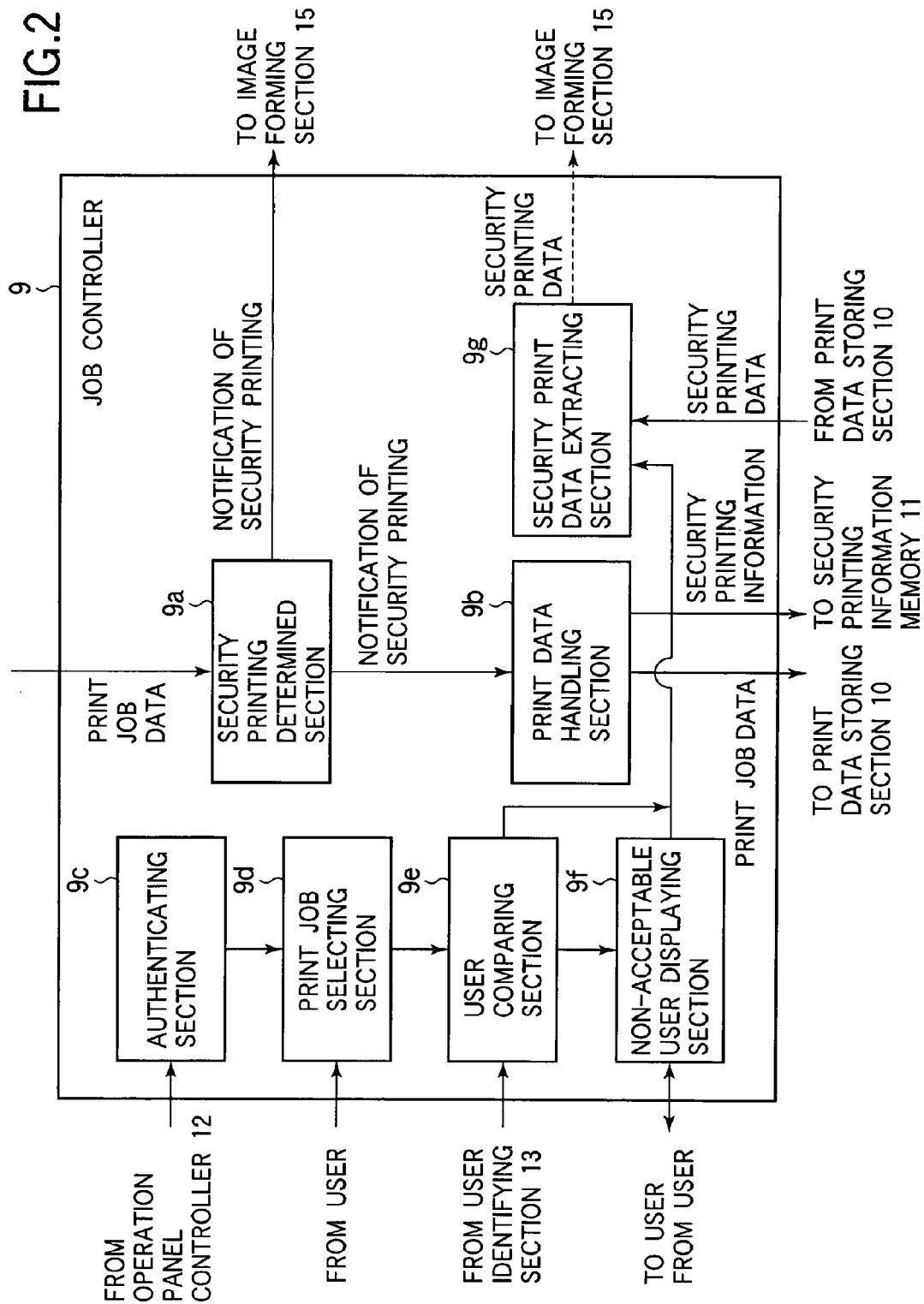

PRINTING SYSTEM AND IMAGE FORMING APPARATUS

CROSS-REFERENCE TO RELATED APPLICATIONS

The present application is a continuation of parent U.S. application Ser. No. 11/802,674, filed May 24, 2007. Furthermore, the present application claims the benefit of priority of Japanese application 2006-147071, filed May 26, 2006. The disclosures of the parent US application and the Japanese priority application are incorporated herein by reference.

BACKGROUND OF THE INVENTION

1. Field of the Invention

The present invention relates to a printing system in which a security watermark pattern lies in the background behind the primary page, and more particularly to a printing system and an image forming apparatus incorporated in the printing system in which a security watermark pattern is the information obtained in a non-contact manner from an employee ID card of a user who operates the image forming apparatus.

2. Description of the Related Art

Japanese Patent Application Laid-Open No. 2004-260273 discloses a conventional printing system in which a security watermark pattern lies in the background behind the primary page. A print driver is installed in a host computer of the printing system. The print driver inquires an administration host prior to a printing operation to determine whether the user is obliged not to leak information. If the user is obliged not to leak information, the security watermark is embedded into the print data to be printed before printing is performed, thereby preventing leakage of information. The information embedded in the security watermark is information that can identify a user name and a host computer that performs printing.

However, information on a host computer that performs printing and a user name of a person who logs on the host computer are not enough information to identify a person who actually takes out a printed document from a printer. Thus, a need exists for improved security of classified information.

SUMMARY OF THE INVENTION

An object of the invention is to provide improved security of classified information.

A printing system includes an image forming apparatus operated by a first user who picks up a printed output of the image forming apparatus, and a host terminal apparatus from which a second user sends print data. The image forming apparatus includes an input section through which the first user inputs a first item of information indicative of the first user, a receiving buffer that stores the print data, and a watermark embedding section that produces a watermark pattern in which information representative of the first item of information is embedded, and that combines the print data with the watermark pattern. The image forming apparatus prints out the received print data with the watermark pattern embedded therein. The watermark pattern includes the first item of information therein.

An image forming apparatus includes an input section through which a first user inputs a first item of information indicative of the first user who picks up a printed output of the image forming apparatus; a receiving buffer that stores print data received from a second user via an external host terminal apparatus; and a watermark embedding section that produces a watermark pattern in which information representative of the first item of information is embedded, and that combines the print data with the watermark pattern. The image forming apparatus prints out the received print data with a watermark pattern embedded therein. The watermark pattern includes the first item of information therein.

The above substitution description corresponds to claim 1 and claim 5.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 1A is a block diagram illustrating a printing system of a first embodiment;

FIG. 1B illustrates a printer of the first embodiment;

FIG. 2 is a block diagram illustrating the functions of a job controller;

DETAILED DESCRIPTION OF THE INVENTION

Figure 3:
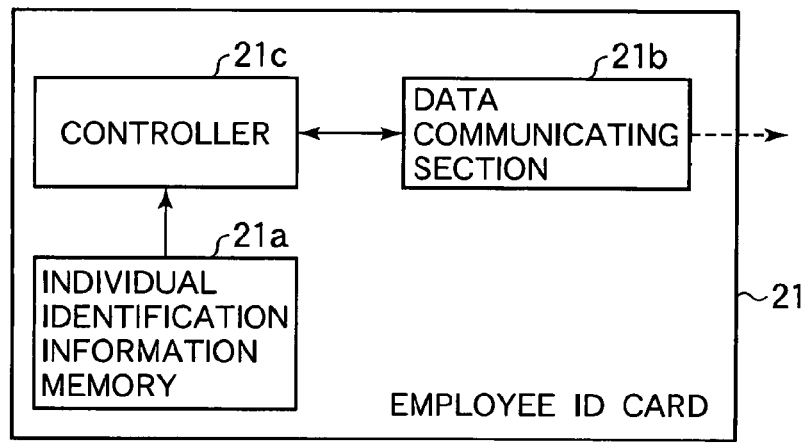
FIG. 3 illustrates the configuration of a non-contact type employee ID card.

The present invention will be described with reference to the accompanying drawings.

First Embodiment

FIG. 1A is a block diagram illustrating a host PC 1 of a printing system 100 of a first embodiment. FIG. 1B illustrates a printer 6 of the printing system 100.

Referring to FIGS. 1A and 1B, the printing system 100 includes a host PC 1, a printer 6, and a network 20. The host PC 1 transmits print data to the printer 6 over the network 20. The print data may or may not include information on a data sending user. The printer 6 receives the print data and performs security printing. The term "security printing" is used to cover printing with a watermark embedded.

{Host PC}

The host PC 1 includes an application 3, a PC name/Login name storing section 4, and a network information storing section 5. The host PC 1 also incorporates a driver 2 that is activated when a CPU (not shown) executes a control program.

The application 3 runs on the host PC 1. A user commands the driver 2 through the application 3 to perform printing. The PC name/Login name storing section 4 holds the name of the host PC 1 and the login name of a data sending user, i.e., a user who is logging on the computer. The network information storing section 5 is a non-volatile memory area that holds, for example, the IP address and MAC address of the host PC 1.

The driver 2 includes an employee ID number registering section 2a, a security watermark embedding specifying section 2b, an information obtaining section 2c, and a job name/job password inputting section 2d.

The employee ID number registering section 2a is a non-volatile memory area that holds an employee ID number inputted by the data sending user when the driver 2 is installed. The security watermark embedding specifying section 2b adds information for security printing to print job data, and sends the print job data with the information to the printer 6. When the driver 2 drives the printer 6 to perform security printing, the information obtaining section 2c obtains associated information to be embedded (i.e., security watermark information) into the security watermark, necessary for security printing. The security watermark information, which is to be embedded, is obtained from the application 3, job name/job password inputting section 2d, and network information storing section 5. When the data sending user wishes to perform printing, the job name/job password inputting section 2d displays an input screen, prompting the data sending user to input the job name and job password on a display unit.

{Printer}

The configuration of the printer 6 will be described with reference to FIG. 1B.

Referring to FIG. 1B, the printer 6 includes print data receiving section 7, a receiving buffer 8, a job controller 9, a print data storing section 10, a security printing information memory 11, an operation panel controller 12, a user identifying section 13, an administrator notifying section 14, an image forming section 15, a security watermark embedding section 16, and a printing controller 17.

The print data receiving section 7 receives the print data, which is sent by the driver 2 over the network 20. The print data may or may not include information on a data sending user. The receiving buffer 8 is a memory area that temporarily holds the print job data received via the print data receiving section 7. The job controller 9 obtains the print job data from the print job data, and sends the print job data to the image forming section 15.

The job controller 9 includes various controlling means for which will be described later, and controls to print the print job data either in the printing mode with a security watermark or in the normal printing mode.

The print data storing section 10 is a memory area (e.g., HDD) that temporarily holds the print job data to be printed with a security watermark. The print job data is in the form of a file. The security printing information memory 11 is a memory area that holds information i.e., file name of a file stored in the print data storing section 10.

The operation panel controller 12 controls a plurality of input switches provided on the operation panel and a string(s) of characters on a liquid crystal display of the printer 6. The user identifying section 13 includes a non-contact type IC card reader. When the non-contact type IC card approaches the printer 6, the non-contact type IC card reader detects a non-contact type IC card (e.g., employee ID card in the form of an RFID), and reads information from the non-contact type IC card.

The administrator notifying section 14 holds the e-mail address of an administrator of the printer 6 stored in a non-volatile memory, and sends information on troubles occurred in the printer 6 by e-mail to the administrator over the network 20. The image forming section 15 receives the print job data from the job controller 9. The image forming section 15 also analyzes the command for the print job data, thereby producing an image to be printed. Then, the image forming section 15 adds the security watermark pattern to the image to be printed to produce a piece of image. The printing controller 17 controls a print engine in the printer 6 to actually perform a printing operation of the piece of image.

{Job Controller}

FIG. 2 is a block diagram illustrating the functions of the job controller 9. The operation of the job controller 9 will be described in detail with reference to FIG. 2.

The job controller 9 includes a security printing determining section 9a, a print data handling section 9b, an authenticating section 9c, a print job selecting section 9d, a user comparing section 9e, a non-acceptable user displaying section 9f, and a security print data extracting section 9g.

The security printing determining section 9a analyzes a header of the print job data to determine whether the print job is for security printing or normal printing. The print data handling section 9b stores the print job data for security printing into the print data storing section 10 (FIG. 1B), and stores security printing information corresponding to the print job data into the security printing information memory 11.

The authenticating section 9c prompts the data sending user to input a job password via the operation panel controller 12, then searches the security printing information memory 11 for security printing data that corresponds to the job password inputted by the data sending user. The print job selecting section 9d displays the job names of print job data for security watermark that are coincident with the job password displayed on the operation panel, prompting the data sending user to select a job name that he/she wants to print. The security watermark printing job data is printing job data that is produced when the data sending user specifies watermark printing.

The user comparing section 9e obtains employee information, stored in a non-contact type employee ID card of the printer operating user, from the user identifying section 13. Then, the user comparing section 9e compares the employee information with the data sending user who wants to perform security printing of the selected job name to determine whether they are coincident. If they are not coincident, the non-acceptable user displaying section 9f displays on the operation panel a warning message "The users are not coincident. Your ID will be printed in security printing. Should the print data still be printed?" This message prompts the user to decide whether printing should be performed.

The security print data extracting section 9g reads the security printing data, which corresponds to the job name selected by the data sending user, from the print data storing section 10, and then sends it to the image forming section 15. At the same time, the security print data extracting section 9g reads security watermark information, which is to be embedded into the security watermark, from the security printing information memory 11. The security print data extracting section 9g then sends the security watermark information to the image forming section 15.

{Non-Contact Type Employee Id Card}

FIG. 3 illustrates the configuration of a non-contact type employee ID card 21. The employee ID card 21 of the first embodiment will be described with reference to FIG. 3. Referring to FIG. 3, the employee ID card 21 includes an individual identification information memory 21a, a data communicating section 21b, and a controller 21c, and takes the form of a non-contact type IC card based on radio frequency identification (RFID).

The individual identification information memory 21a is a memory area that holds an employee number for identifying the owner of the employee ID card 21, and that holds information on the card standard of the employee ID card 21. The data format of the data to be stored into the individual identification information memory 21a will be described later. The data communicating section 21b includes an antenna, and communicates the data with the IC card reader in the user identifying section 13 through the antenna. The IC card reader of the user identifying section 13 in the printer 6 issues a command to read data. In response to the command, the controller 21c reads the information on the employee ID card 21 from the individual identification information memory 21a, and sends out the information through the data communication section 21b to the user identifying section 13 using a radio wave (i.e., without physical contact between the controller 21c and the user identifying section 13.

{Data Format for Security Printing}

Figure 4:
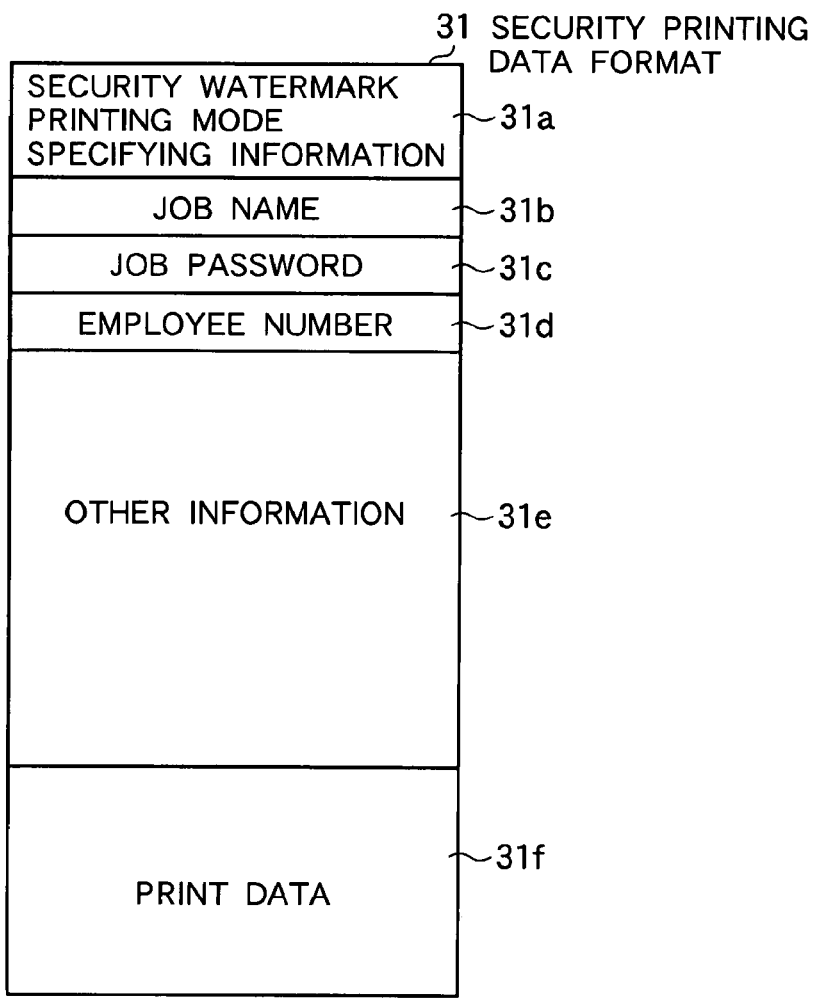
FIG. 4 illustrates the format of security printing data.

FIG. 4 illustrates the format of the security watermark printing data. The data format for security printing will be described with reference to FIG. 4.

A security watermark printing data format 31 includes SECURITY WATERMARK PRINTING MODE SPECIFYING INFORMATION 31a, JOB NAME 31b, JOB PASSWORD 31c, EMPLOYEE NUMBER 31d, OTHER INFORMATION 31e into which other information is to be embedded, and PRINT DATA 31f.

SECURITY WATERMARK PRINTING MODE SPECIFYING INFORMATION 31a is a data area that holds a specific string of characters indicating that the data is for security printing. JOB NAME 31b is a data area that holds a string of characters indicative of a job name that identifies the print data. When the printer 6 performs security printing, the characters in JOB NAME 31b is displayed as a job name on the operation panel of the printer 6. The JOB PASSWORD 31c is a data area that holds a job password to be inputted before the printer 6 selects the security printing data. The EMPLOYEE NUMBER 31d is a data area that holds the employee number of the data sending user who sent the print data to the printer 6. The OTHER INFORMATION 31e is a data area that holds information other than the job name and employee number. This information is to be embedded into the security watermark. PRINT DATA 31f holds the print command data.

{Format of Security Printing Information}

Figure 5:
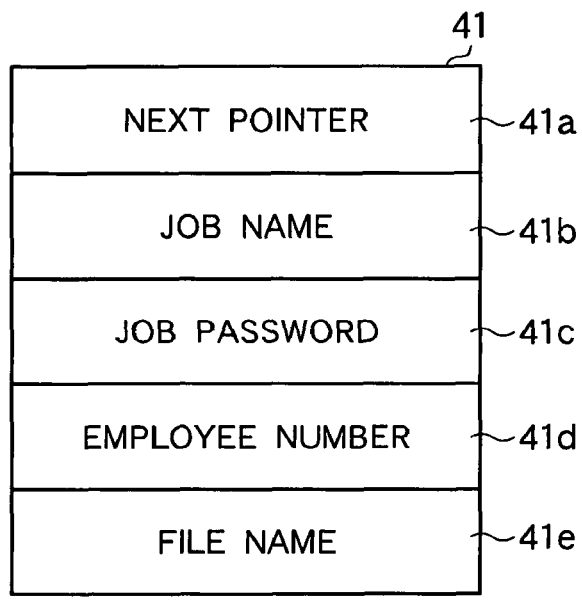
FIG. 5 illustrates the format of security printing information that is registered into a security printing information memory.

FIG. 5 illustrates the format of the security printing information that is registered into the security printing information memory 11. A security watermark printing information format 41 includes NEXT POINTER 41a, JOB NAME 41b, JOB PASSWORD 41c, EMPLOYEE NUMBER 41d, and FILE NAME 41e.

The NEXT POINTER 41a is a pointer that points to the next item of security printing information when a plurality of items of security printing information have registered in the security printing information memory 11. JOB NAME 41b, JOB PASSWORD 41c, and EMPLOYEE NUMBER 41d are data areas in which data corresponding to the data in JOB NAME 31b, JOB PASSWORD 31c, and EMPLOYEE NUMBER 31d having data structures equivalent to those of the security watermark printing data format 31. FILE NAME 41e is a file name indicative of a storing section into which the security printing data is stored. If the security printing data is stored into the print data storing section 10, FILE NAME 41e indicates the print data storing section 10 as a storing section into which the security printing data is stored.

{Registration of Security Printing Information}

Figure 6:
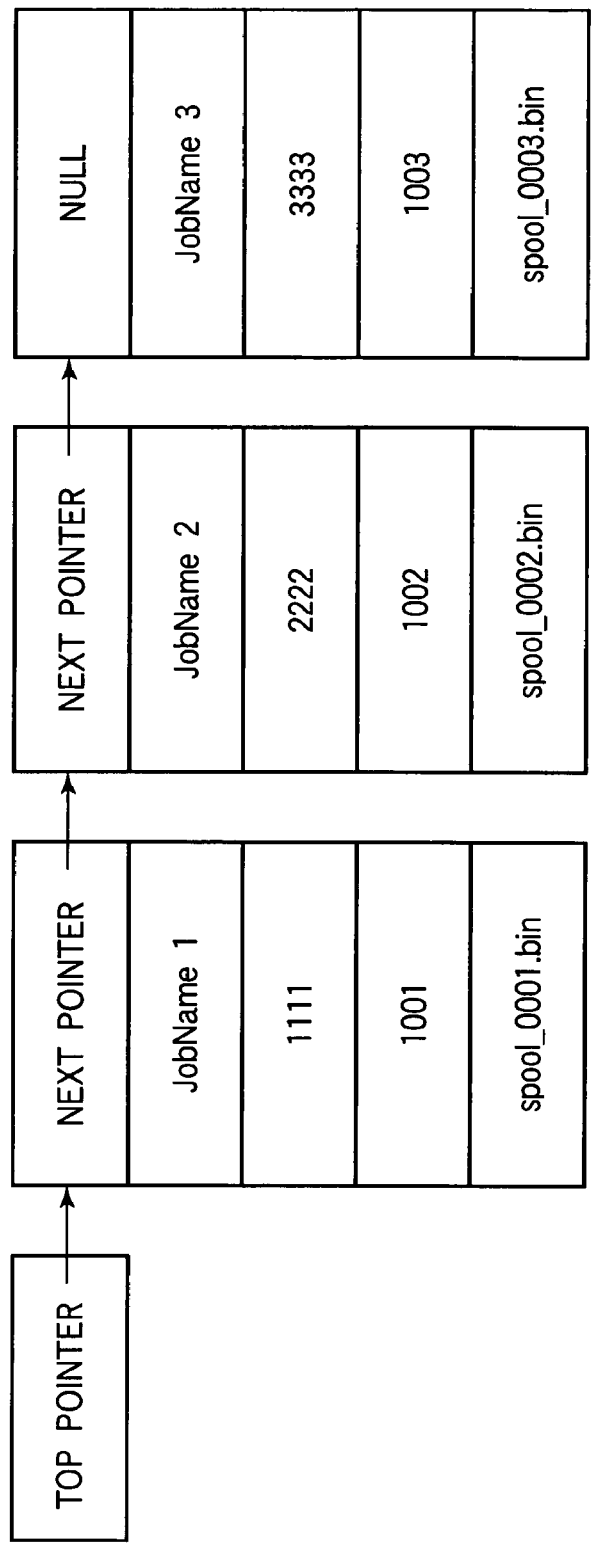
FIG. 6 illustrates three items of security printing information registered in the security printing information memory.

FIG. 6 illustrates three items of security printing information registered in the security printing information memory 11. The content of the pointer will be described with reference to FIG. 6. Referring to FIG. 6, the respective items of security printing information may be traced in sequence starting from the NEXT POINTER. As described above, part of the data (i.e., security printing data received from the host PC 1 is registered into the print data storing section 10, and another part of the data (i.e., security printing data is registered into the security printing information memory 11. The received security printing data is not printed immediately after it is received but is temporarily held in the printer.

{Format of Data in Employee ID Card}

Figure 7:
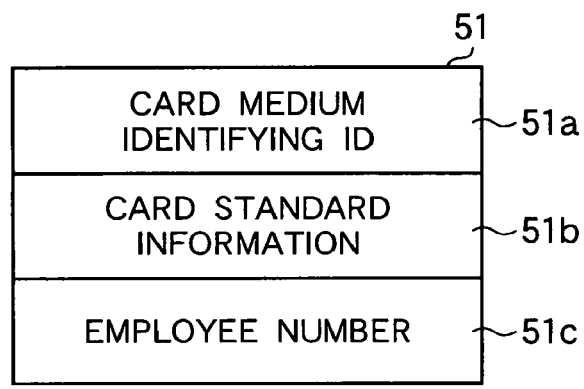
FIG. 7 illustrates the data format of the non-contact type employee ID card.

FIG. 7 illustrates the data format of the employee ID card 21. FIG. 7 illustrates the format of the data that is stored into the individual identification information memory 21a of the non-contact type employee ID card 21. An individual identification information format 51 of the employee ID card 21 includes CARD MEDIUM IDENTIFYING ID 51a, CARD STANDARD INFORMATION 51b, and EMPLOYEE NUMBER 51c.

The CARD MEDIUM IDENTIFYING ID 51a is a data area that holds data by which the card is identified. The data serves as an address of the employee ID card 21 so that the card reader can identify the employee ID card 21 before the card reader communicates with the employee ID card 21. CARD STANDARD INFORMATION 51b is a data area that holds information indicative of the card standard that may be accepted by the printer 6 of the first embodiment. EMPLOYEE NUMBER 51e is a data area that holds an employee number for identifying the owner of the employee ID card 21.

{Operation of Printing System}

The operation of the printing system of the first embodiment will be described.

The following conditions are assumed.

Condition #1: The data sending user of the host PC 1 (FIG. 1) is a bearer of the employee ID card 21 (FIG. 3). The employee number has been stored into the individual identification information memory 21a of the employee ID card 21 by the administrator who issues the employee ID card.

Condition #2: The data sending user has installed the special driver 2 (FIG. 1) into the host PC 1 in order to prevent someone from fraudulently printing classified information file through the host PC 1 and from sneaking it out of the company. The data sending user has also inputted his employee number into the employee ID number registering section 2a of the driver 2.

The mail address of the administrator has been stored into the administrator notifying section 14 of the printer 6 by the administrator of the printer 6.

Figure 8:
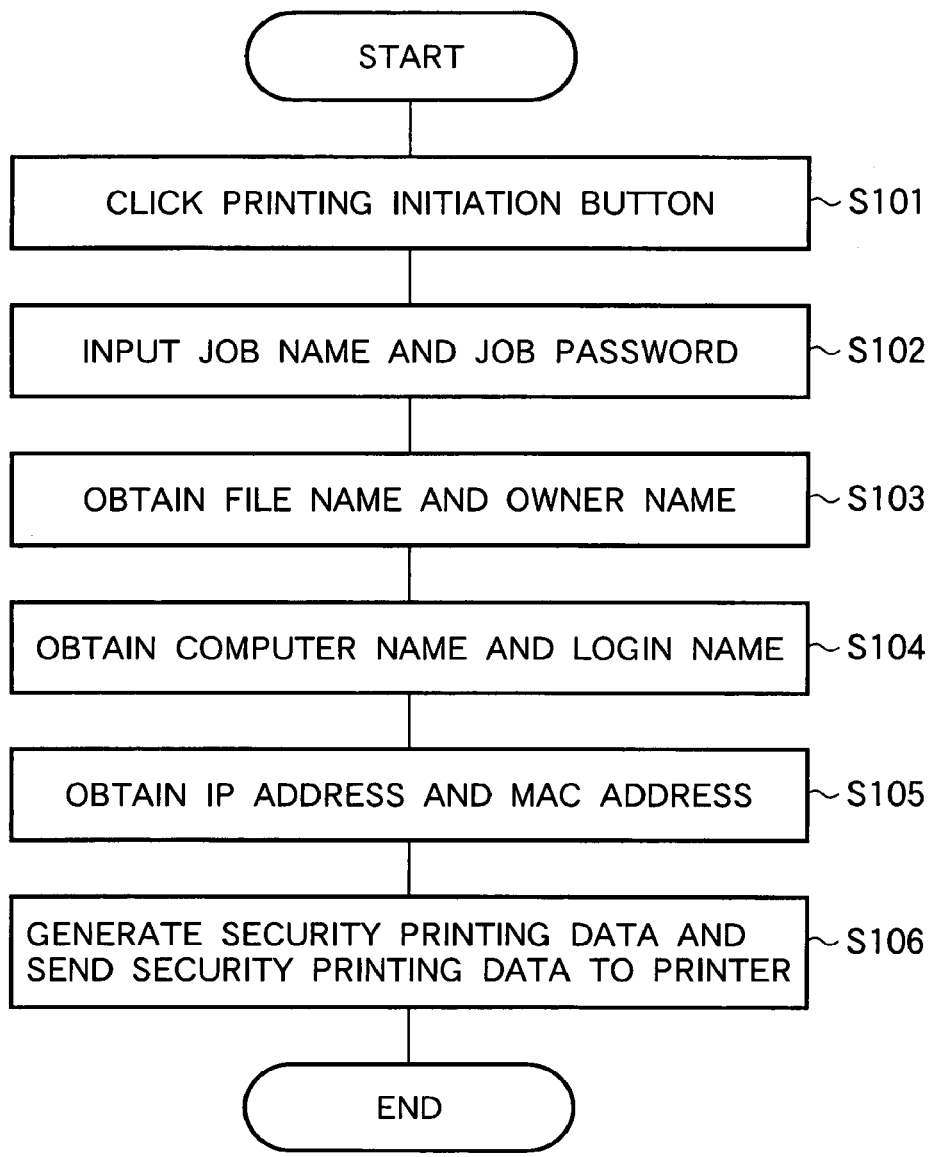
FIG. 8 is a flowchart illustrating the operation in which the host PC sends print data.

FIG. 8 is a flowchart illustrating the operation in which the host PC 1 sends the print data.

The operation of the printing system will be described with reference to the flowchart in FIG. 8, in which operation, the data sending user of the host PC 1 transmits the print data to the printer 6.

Step S101:

The data sending user controls the application 3 to open a file to be printed, and then selects a printing menu of the application 3. Upon selection of the printing menu, the driver 2 is activated and a driver screen is displayed. The data sending user clicks a printing initiation button on the driver screen. In response to the command to start printing from the data sending user, the driver 2 activates the job name/job password inputting section (FIG. 1).

Step S102:

The job name/job password inputting section 2d displays an input screen, which prompts the data sending user to input a job name and a job password through the input screen. Then, the data sending user inputs a job name (e.g., job name=JobName) and a job password (e.g., Job password=1111) through a key board. The data sending user inputs this job password through the operation panel of the printer (step S303 in FIG. 10) and a list of print jobs will be displayed (step S307 in FIG. 10). Upon having received the job name and job password inputted by the data sending user, the driver 2 activates the information obtaining section 2c.

Step S103:

The information obtaining section 2c obtains the file name of a file to be printed and the owner name of the file from the application 3.

Step S104:

The information obtaining section 2c obtains from the PC name/Login name storing section 4 the computer name of the host PC 1 and the login name of the data sending user who is currently logging on the host PC 1.

Step S105:

The information obtaining section 2c obtains the IP address and MAC address of the host PC 1.

Step S106:

Once the information obtaining section 2c has obtained all the necessary information including the IP address and MAC address, the driver 2 activates the security watermark embedding specifying section 2b. The security watermark embedding specifying section 2b generates security printing data, which is for example, a string of characters (e.g., DIGITAL_WATERMARK_PRINT=ENABLE) for specifying the security printing. The security watermark embedding specifying section 2b stores the string of characters into SECURITY WATERMARK PRINTING MODE SPECIFYING INFORMATION 31a.

The security watermark embedding specifying section 2b obtains a job name which has been inputted by the data sending user through the job name/job password inputting section 2d, and stores the job name into JOB NAME 31b. The job name is, for example, a string of characters DIGITAL_WATERMARK_JOBNAME="JobName 1."

The security watermark embedding specifying section 2b obtains a job password which has been inputted by the data sending user through the job name/job password inputting section 4, and stores the job password into JOB PASSWORD 31c. The job password is, for example, DIGITAL_WATERMARK_JOBPASS WORD="1111."

The security watermark embedding specifying section 2b obtains an employee number from the employee ID number registering section 2a, and stores the employee ID number into EMPLOYEE NUMBER 31d. The employee number is, for example, DIGITAL_WATERMARK_IDNO="1001".

The security watermark embedding specifying section 2b also obtains various items of information from the information obtaining section 2c, and stores them into OTHER INFORMATION 31e. The various items of information include file name, owner name, computer name, log-in name, IP address, and MAC address. An example of the various items of information is DEGITAL_WATERMARK_OTHERINFO=("filename1", "fileuser1", "computer1", "loginuser1", "XX.XX.XX.XX." "YY-YY-YY-YY-YY-YY-YY").

The security watermark embedding specifying section 2b produces print command data used for printing a page with security watermark embedded in an image, and stores the print command data into PRINT DATA 31f. As described above, the print data is produced according to the security watermark printing data format 31. Then, the driver 2 transmits the print data to the printer 6 over the network.

Figure 9:
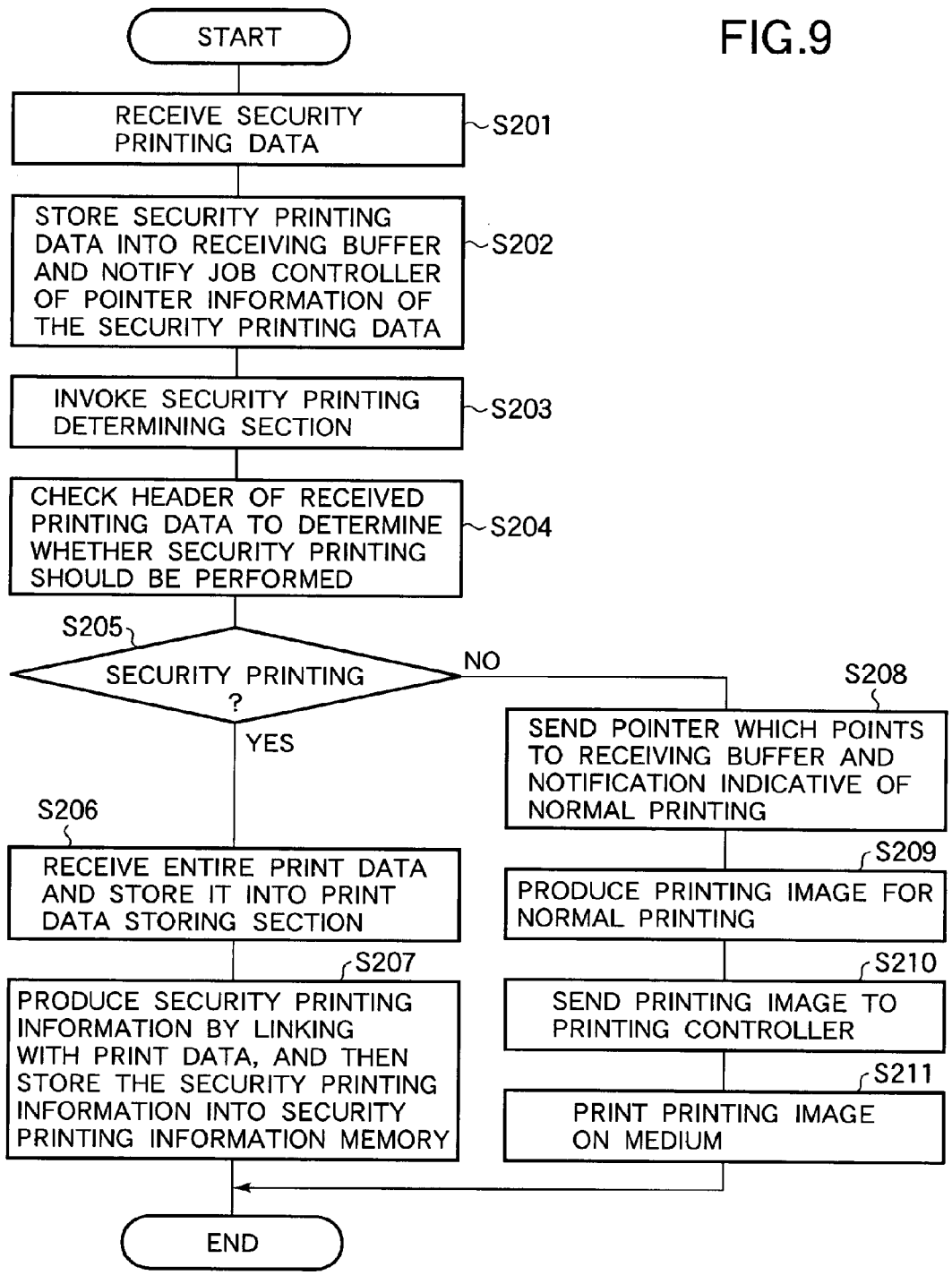
FIG. 9 is a flowchart illustrating the operation in which the printer receives the security printing data.

FIG. 9 is a flowchart illustrating the operation in which the printer 6 receives the security printing data. The operation will be described with reference to FIG. 9.

Step S201:

The print data receiving section 7 receives the security printing data from the driver 2 of the host PC 1.

Step S202:

The print data receiving section 7 stores the security printing data into the receiving buffer 8, and notifies the job controller 9 of the pointer information for the printing data stored in the receiving buffer 8.

Step S203:

Upon receiving the pointer information, the job controller 9 invokes the security printing determining section 9a.

Step S204:

The security printing determining section 9a checks the header of the received security printing data to determine whether the received print job data is for security printing or normal printing. In other words, the security printing determining section 9a checks the header to determine whether SECURITY WATERMARK PRINTING MODE SPECIFYING INFORMATION 31a holds a string of characters indicative of security printing.

Step S205:

If the data received from the host PC 1 is for security printing, the program proceeds to step S206. If NO, the program proceeds to step S208.

Step S206:

The print data handling section 9b receives the entire print data from the receiving buffer 8, and stores the print data into the print data storing section 10.

Step S207:

The print data storing section 10 produces the security printing information in FIG. 5 according to the security watermark printing data format 31 in FIG. 4, the security printing information being linked with the print data stored in the print data storing section 10. The data for the security printing information is copied from JOB NAME 31b, JOB PASSWORD 31c, and EMPLOYEE NUMBER 31d in the security printing data in FIG. 4, and is stored into data areas for the NEXT POINTER 41a, JOB NAME 41b, JOB PASSWORD 41c, and EMPLOYEE NUMBER 41d in FIG. 5, respectively. The security printing information is then stored into the security printing information memory 11. A file name of the security printing data stored in the print data storing section 10 is stored into the FILE NAME 41e. A pointer information is stored into the NEXT POINTER 41a, being used to indicate an address of the next security printing information when a plurality of items of security printing information are registered in the security printing information memory 11.

Step S208:

If the data received from the host PC 1 is not for security watermark printing, the program proceeds to step S206, (i.e., if the print data receiving section 7 receives the data not from the driver 2 that performs security watermark printing but from a driver that performs normal printing), then the job controller 9 sends a pointer, which points to the receiving buffer 8, to the image forming section 15 together with a notification that indicates the data is for normal printing.

Step S209:

The image forming section 15 produces a printing image to be printed in the normal printing mode.

Step S210:

The image forming apparatus 15 sends the printing image to the printing controller 17.

Step S211:

Upon receiving the printing image, the printing controller 17 actually prints the printing image on a medium such as paper.

{Security Printing}

A description will be given of the operation in which the security printing data temporarily stored in the printer 6 is printed.

Figure 10:
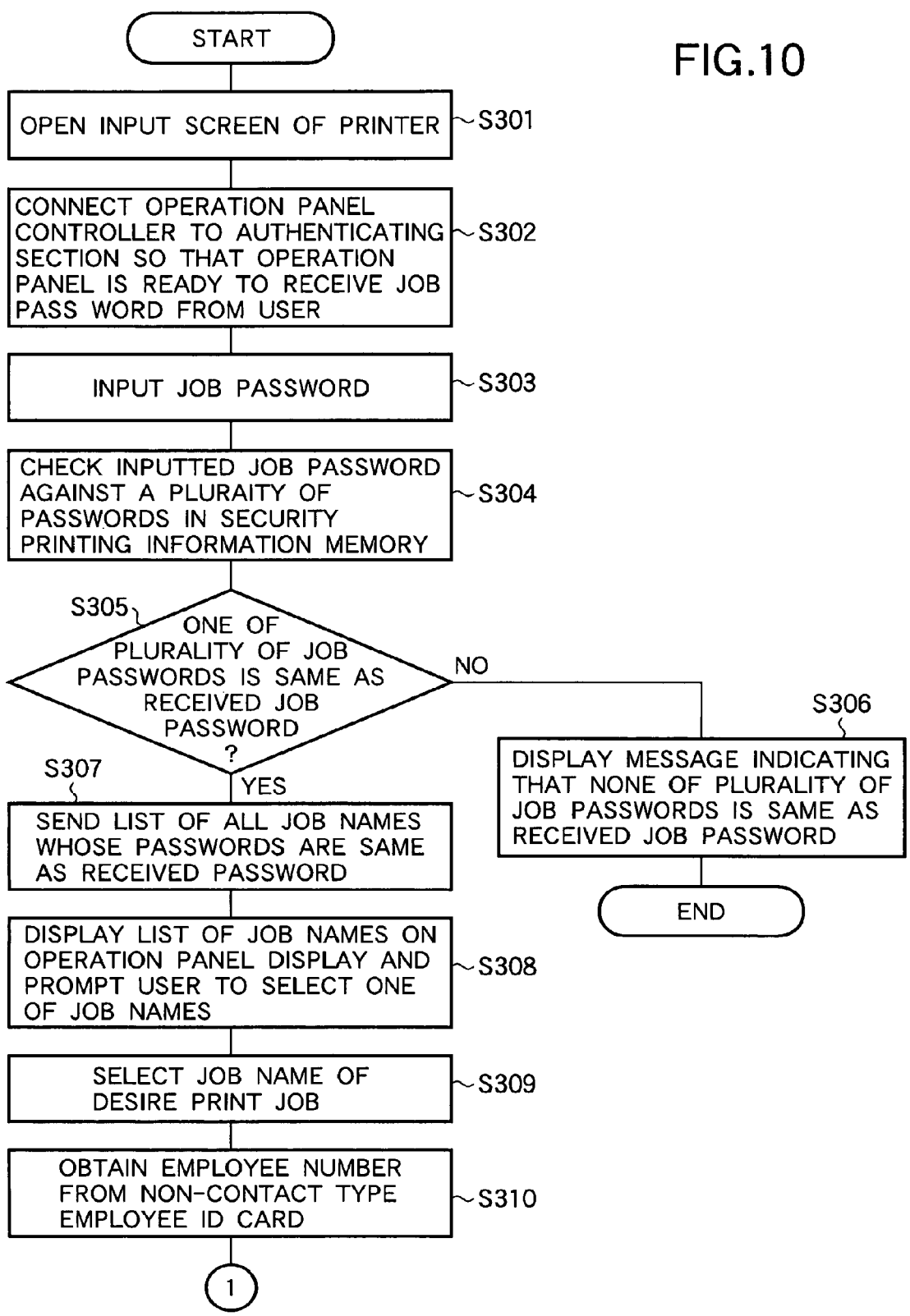
FIG. 10 is an initial portion of the flowchart illustrating the security printing.

FIG. 10 is an initial portion of the flowchart of the security printing.

Figure 11:
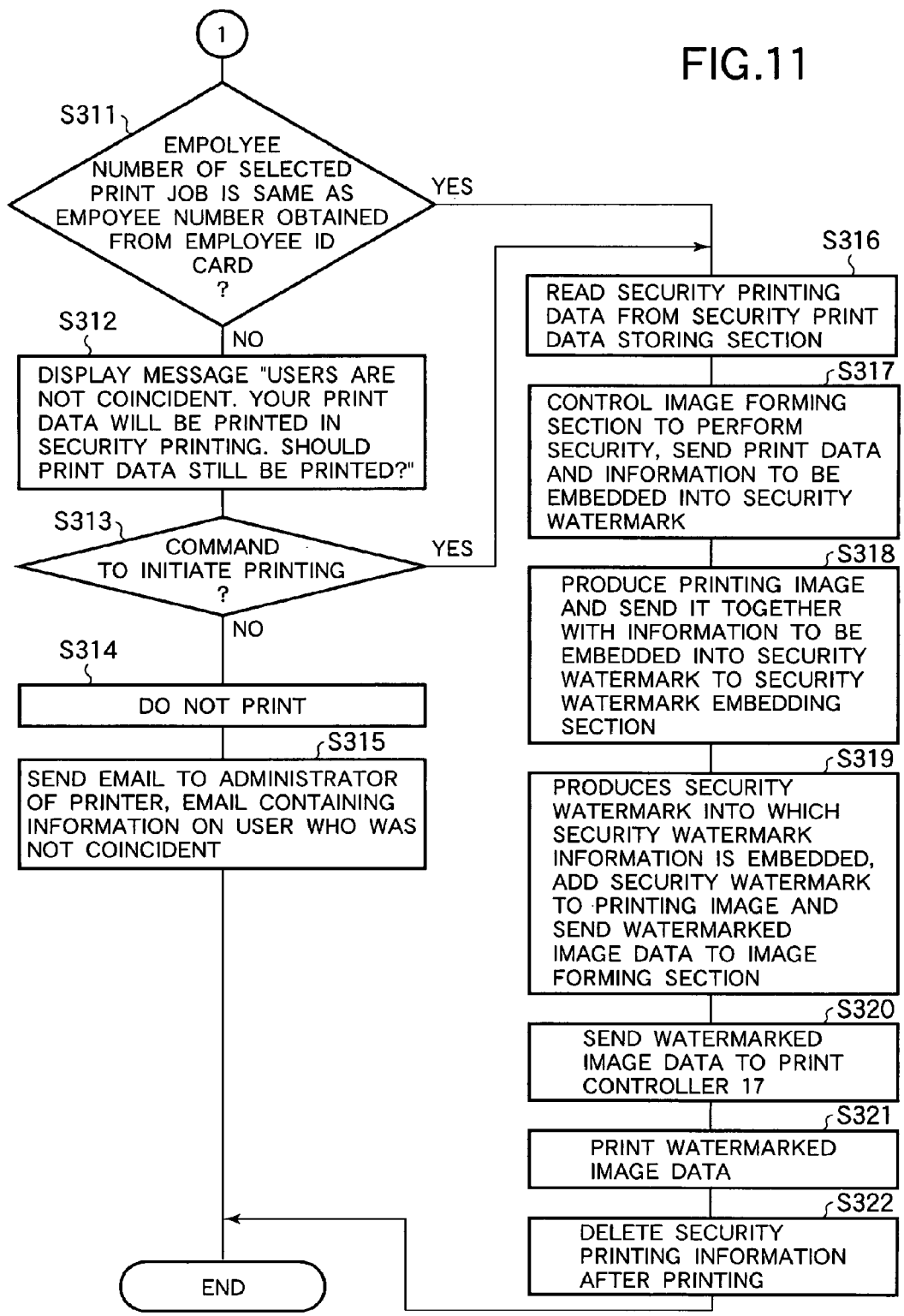
FIG. 11 is an additional portion of the flowchart illustrating the security printing.

FIG. 11 is an additional portion of the flowchart of the security printing.

Step S301:

The data sending user first sends the security printing data into the printer 6, and then goes to the printer 6 and operates the operation panel (not shown) of the printer 6 to open an input screen on a display unit, which in turn prompts the printer operating user to input the job name and job password. It should be noted that the data sending user is now a printer operating user.

Step S302:

The operation panel controller 12 of the printer 6 is connected to the authenticating section 9c, so that the operation panel is ready to receive a job password from the printer operating user.

Step S303:

Then, the printer operating user inputs a job password into the printer 6 through the operation panel, the job password being the same job password as the printer operating user input into the driver 2 when the printer operating user sent the security printing data from the host PC 1.

Step S304:

The authenticating section 9c checks the inputted job password against a plurality of job passwords stored in the security printing information memory 11.

Step S305:

If none of the plurality of job passwords is the same as the job password, the program proceeds to step S306. If one of the plurality of job passwords is the same as the received job password, the program proceeds to step S307.

Step S306:

If none of the plurality of job passwords is the same as the received job password, the authenticating section 9c displays a message to the printer operating user on the operation panel display, the message indicating that none of the plurality of job passwords is the same as the received job password.

Step S307:

If at least one of the plurality of job passwords is the same as the received job password at step S305, then the authenticating section 9c sends a list of all job names whose job passwords are the same as the received job password.

Step S308:

The print job selecting section 9d displays the list of the job names on the operation panel display, prompting the printer operating user to select one of the job names.

Step S309:

The printer operating user selects the job name of a desired print job from among the listed job names.

Step S310:

The user comparing section 9e communicates with the employee ID card 21 by a radio wave, via the user identifying section 13, thereby obtaining an employee number from EMPLOYEE NUMBER 51c of the individual identification information memory 21a.

Step S311:

If the employee number of a print job selected by the printer operating from the operation panel is coincident with that obtained from the employee ID card 21 of the printer operating user, the program proceeds to step S316, If NO, the program proceeds to step S312.

Step S312:

The non-acceptable user displaying section 9f displays a message "The users are not coincident. Your print data will be printed in security printing. Should the print data still be printed?" prompting the printer operating user to respond.

Step S313:

If the printer operating user commands to initiate printing, the program proceeds to step S316. If NO, the program proceeds to step S314.

Step S314:

No printing is performed.

Step S315:

The non-acceptable user displaying section 9f invokes the administrator notifying section 14, and sends an email to the administrator of the printer, the email containing information to be embedded into a security watermark. The security watermark information, which is to be embedded into the security watermark is, for example, an employee number (FIG. 6)) extracted from the employee ID card of a printer operating user who gave up printing. The information to be embedded into the security watermark also includes the contents of JOB NAME 31b, EMPLOYEE NUMBER 31d, and OTHER INFORMATION 31e, which are received from the host PC 1. In this manner, the administrator of the printer 6 is able to identify a printer operating user who gave up printing due to the warning message.

Step S316:

If the employee number for the job selected by the printer operating user through the operation panel coincides the employee number obtained from the employee ID card that the printer operating user is bearing, the security print data extracting section 9g reads the security printing data from the print data storing section 10 by way of the content of the FILE NAME 41e (FIG. 5) that bears the same employee number.

Step S317:

The job controller 9 controls the image forming section 15 to perform security printing, sending the print data extracted from PRINT DATA 31f and the information to be embedded into the security watermark. The information to be embedded into the security watermark includes the content of EMPLOYEE NUMBER 51c extracted from the employee ID card of a printer operating user who gave up printing. The security watermark information, which is to be embedded into the security watermark, also includes the contents of JOB NAME 31b, EMPLOYEE NUMBER 31d, and OTHER INFORMATION 31e, which are received from the host PC 1.

Step S318:

The image forming section 15 analyzes and processes the content of PRINT DATA 31f, to produce printing image just as in the normal printing. The image forming section 15 then sends the printing image together with the information to be embedded into a security watermark to the security watermark embedding section 16.

Step S319:

The security watermark embedding section 16 produces a security watermark into which the security watermark information is embedded. Then, the security watermark embedding section 16 adds the security watermark to the printing image, and sends the watermarked image data to the image forming section 15.

Step S320:

The image forming section 15 sends the watermarked image data to the printing controller 17.

Step S321:

The printing controller 17 prints the watermarked image data.

Step S322

After the printing controller 17 has completed printing, the job controller 9 deletes the security printing information from the security printing information memory 11 and corresponding print data from the print data storing section 10.

In the first embodiment, the embodiment has been described with respect to a printing system in which printing is performed by embedding into a watermark both the data sending user who activated the printing operation from the host PC 1 and the user who actually commanded to print. Alternatively, only identifying the printer operating user who actually commanded to print may also be effective in minimizing the chance of classified information of being leaked. In other words, the employee number of the data sending user who activated the printing operation from the host PC 1 may not be embedded into the watermark pattern and only the employee number of the user who actually commanded to print may be embedded into the watermark pattern.

As described above, the security printing may be performed by embedding the employee number of a printer operating user who actually commanded to print. If a data sending user who commands to perform printing from the host PC 1 is different from a printer operating user who actually picks up the printed output from the printer, the employee numbers of the both users may be embedded into the security watermark. The administrator of the printer may be notified when a printer operating user gives up printing due to a warning message that a data sending user who commands to perform printing from the host PC 1 is different from a printer operating user who actually picks up the printed output from the printer (i.e., fraudulent use of the printer). The printing system of the first embodiment improves security. For example, if someone sneaks printed paper out of the company, then the information embedded into the security watermark may be read with a specifically designed tool, so that the employee number of the use who actually picks up the printed output may be identified enhancing leakage prevention effect.

Second Embodiment

Figure 12:
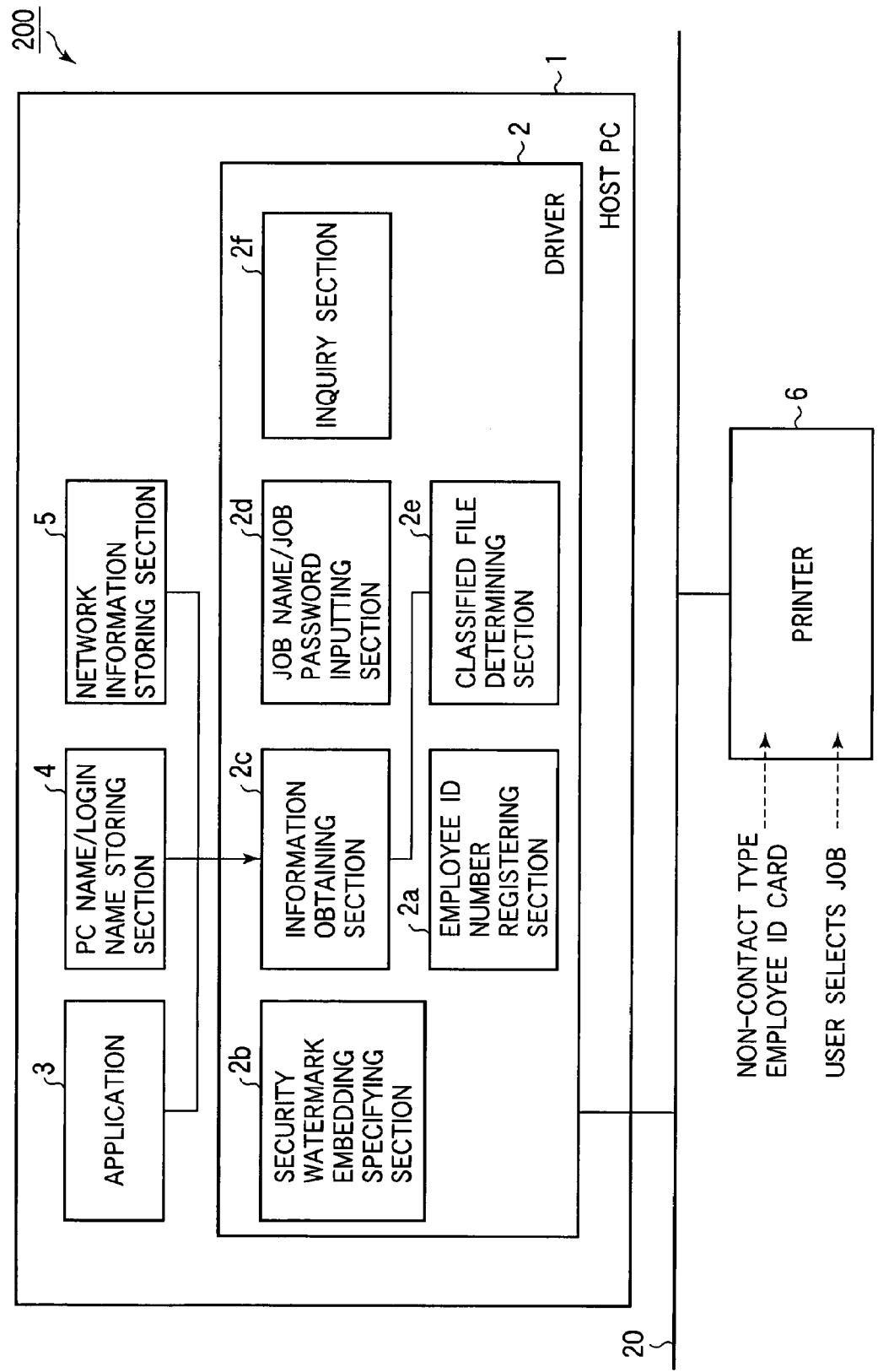
FIG. 12 illustrates a printing system of a second embodiment.

FIG. 12 illustrates a printing system 200 of a second embodiment.

Referring to FIG. 12, the printing system 200 includes a host PC 1, a printer 6, and a network 20. The host PC 1 transmits print data over the network 20 to the printer 6. The print data may or may not include information on a data sending user who activates printing from the host PC 1. The printer performs security printing for the print data. The second embodiment differs from the first embodiment in the configuration of the host PC 1. Elements similar to those of the first embodiment have been given the same reference numerals and their description is omitted.

Referring to FIG. 12, the host PC 1 includes an application 3, a PC name/Login name storing section 4, and a network information storing section 5. A driver 2 has been installed in the host PC 1 and is activated when a CPU (not shown) executes a control program. The operating system of the host PC 1 of the second embodiment employs a file system that includes an attribute indicative of levels of security classification of information. This allows users to assign different classifications (e.g., security level "AAA" or "AA") to the attribute of a file containing classified information generated in the host PC 1.

The driver 2 includes an employee ID number registering section 2a, a security watermark embedding specifying section 2b, an information obtaining section 2c, and a job name/job password inputting section 2d, a classified file determining section 2e, and an inquiry section 2f. The driver 2 of the second embodiment differs from the driver of the first embodiment in that the classified file determining section 5 and inquiry section 2f are added.

The classified file determining section 5 obtains a value of attribute indicative of the level of classification from among items of attribute information of a file that is currently being edited by the application 3, and makes a decision based on the obtained the value of attribute to determine whether the file is assigned to a high security level, e.g., classification equal to or higher than "AA."

If a high classification has been assigned to the file that the data sending user wants to print, the inquiry section 2f displays a warning message "You are going to print a classified file. The watermark of your ID will be embedded into the print. Should the file still be printed?", prompting the data sending user to respond.

{Operation}

The operation of the printing system of the second embodiment will be described.

The following conditions are assumed.

Condition #1: The data sending user who sends print data from the host PC 1 (FIG. 12) is a bearer of an employee ID card 21 (FIG. 3) of the non-contact type. An employee number has been stored into an individual identification information memory 21a of the employee ID card 21 by the administrator who is in charge of issuing the employee ID card.

Condition #2: The data sending user has installed the special driver 2 (FIG. 12) into the host PC 1 in order to prevent someone else from fraudulently printing a classified information file through the host PC 1 and sneaking it out of the company. The data sending user has also inputted his employee number into the employee ID number registering section 2a of the driver 2.

The mail address of the administrator has been stored into the administrator notifying section 14 of the printer 6 by the administrator of the printer 6.

Condition #3: Classifications (e.g., level of security is "AAA" or "AA") have been assigned by the data sending user to the attributes of the classified files stored in the host PC 1.

The operation of the printing system of the second embodiment will be described in which print data is transmitted from the host PC 1 to the printer 6 under Conditions #1-#3. The printer operates in the same way as in the first embodiment and its description is omitted.

Figure 13:
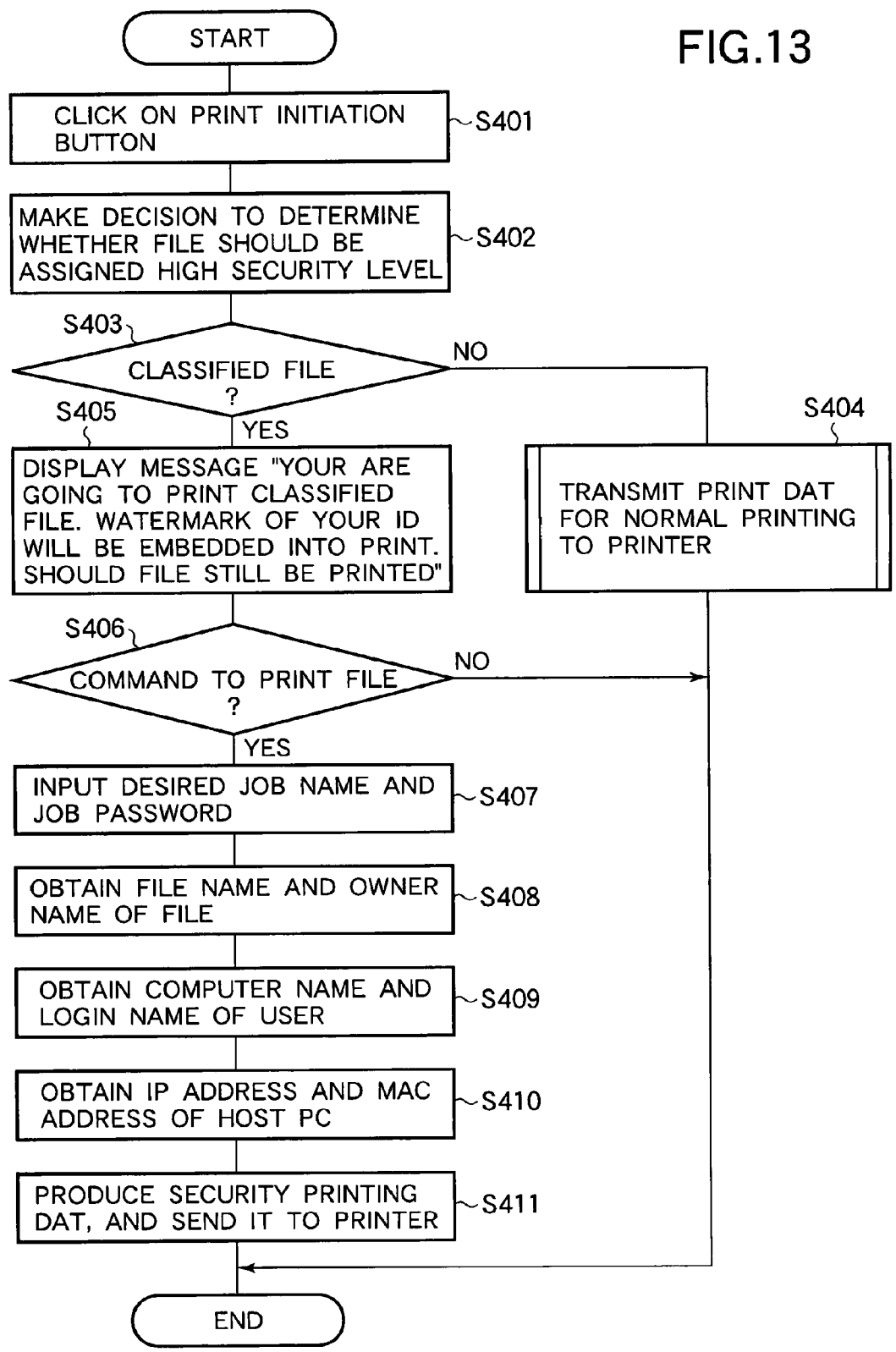
FIG. 13 is a flowchart illustrating the operation of a host PC of the second embodiment when print data is transmitted to the printer.

FIG. 13 is a flowchart illustrating the operation of the host PC 1 of the second embodiment when print data is transmitted to the printer 6.

Step S401:

The data sending user controls the application to open a file to be printed, and selects a menu for printing so that the driver 2 is activated to display a driver screen. Then, the data sending user clicks on a print initiation button of the driver 2. In response to the command to initiate printing from the data sending user, the driver 2 activates the classified file determining section 5.

Step S402:

The classified file determining section 5 obtains via the information obtaining section 2c a value of attribute indicative of the level of classification from among items of attribute information of a file that is currently being edited by the application 3. Then, The classified file determining section 5 makes a decision based on the obtained the value of attribute to determine whether the file should be assigned a high security level, e.g., classification equal to or higher than "AA."

Step S403:

If the file is not classified, the program proceeds to step S404. If the file is classified, the program proceeds to step S405.

Step S404:

The driver 2 transmits print data for normal printing to the printer 6. In other words, if the file currently being edited is not classified, the printer 6 performs normal printing without watermarking.

Step S405:

The driver 2 activates the inquiry section 2f, which in turn displays the warning message "You are going to print a classified file. The watermark of your ID will be embedded into the print. Should the file still be printed?", prompting the data sending user to respond.

Step S406:

In response to the warning message, the data sending user inputs a command either to print the file or not to print. If the user inputs a command not to print, then the printing is interrupted and the flow ends. If the data sending user inputs a command to print, the program proceeds to step S407.

Step S407:

The job name/job password inputting section 2d displays a screen that prompts the data sending user to input a job name and a job password. The data sending user inputs a job name (e.g., "JobName") and a job password (e.g., "1111"). Then, the driver 2 activates the information obtaining section 2c.

Step S408:

The information obtaining section 2c obtains a file name and the owner name of the file to be printed.

Step S409:

The information obtaining section 2c obtains a computer name and the login name of a data sending user i.e., a user who is logging on the computer, from the PC name/Login name storing section 4.

Step S410:

The information obtaining section 2c obtains the IP address and MAC address Of the host PC 1 from the network information storing section 5.

Step S411:

After the information obtaining section 2c completes it operation, the driver 2 activates the security watermark embedding specifying section 2b, which in turn produces the security printing data according to a security watermark printing data format 31 (FIG. 4).

The security watermark embedding specifying section 2b stores a string of characters (e.g., DIGITAL_WATERMARK_PRINT=ENABLE) for specifying the security printing into SECURITY WATERMARK PRINTING MODE SPECIFYING INFORMATION 31a.

The security watermark embedding specifying section 2b obtains a job name which has been inputted by the data sending user through the job name/job password inputting section 2d, and stores the job name into SECURITY WATERMARK PRINTING MODE SPECIFYING INFORMATION 31a. The job name is, for example, DIGITAL_WATERMARK_JOBNAME="JobName 1."

The security watermark embedding specifying section 2b obtains a job password which has been inputted by the data sending user through the job name/job password inputting section 2d, and stores the job password into JOB PASSWORD 31c. The job password is, for example, DIGITAL_WATERMARK_JOBPASSWORD="1111."

The security watermark embedding specifying section 2b obtains an employee number from the employee ID number registering section 2a, and stores the employee ID number into EMPLOYEE NUMBER 31d. The employee number is, for example, DIGITAL_WATERMARK_IDNO="1001".

The security watermark embedding specifying section 2b also obtains various items of information from the information obtaining section 2c, and stores them into OTHER INFORMATION 31e. The various items of information include file name, owner name, computer name, log-in name, IP address, and MAC address. Examples of the various items of information are DEGITAL_WATERMARK_OTHER-INFO=("filename1", fileuser1", "computer1", "loginuser1", "XX.XX.XX.XX." "YY-YY-YY-YY-YY-YY-YY".

The security watermark embedding specifying section 2b produces print command data used for performing printing a page with a security watermark embedded in an image. As described above, the print data is produced according to the security watermark printing data format 31. Then, the driver 2 transmits the print data to the printer 6 over the network 20. The print data may or may not include information on a data sending user, i.e., a user who activates printing.

As described above, the printing with a watermark embedded is performed only for classified files that have been pre-assigned by the data sending user. Non-classified files are printed normally. The second embodiment is effective in improving the usefulness of the printing system while also maintaining desired security levels. As to whether printing should be performed, the data sending user may make a decision on the host PC 1 side before the print data is transmitted to the printer rather than on the printer side. This allows saving of resources such as a memory area for print data in the printer.

Embedding information specific to the operator, who takes out a document from the printer that printed the document, allows identifying of a person who actually takes out the printed document from the printer.

While the employee ID card of the first embodiment has been described in terms of a non-contact type IC card, the invention may be applicable to a conventional card pass system in which a card reader reads a card. The watermark of the first embodiment has been described in terms of an electronic watermark technology in which a pattern difficult for human eyes to recognize the meaning of the pattern is embedded into a margin of paper. Instead, a string of characters that may be recognized by human eyes may be printed in a margin of paper. While the operation panel controller of the first embodiment displays the warning message that the printer operating user is not an authorized person, the warning message may also be implemented by a buzzer or a lamp that cycles on and off. The second embodiment is directed to a technique in which if a file to be printed is classified, a message is indicated to the data sending user that printing will be performed with his employee number embedded into a watermark, prompting the data sending user to respond to the warning message. Alternatively, the inquiry section may notify the administrator of the printer instead of terminating a printing operation when the data sending user gives up in response to the warning message.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A printing system, comprising:
an image forming apparatus that is accessible by a plurality of first users who pick up printed output from the image forming apparatus, each of the first users having a first item of information indicative of that first user;
a host terminal apparatus from which a second user sends print data including a second item of information indicative of a second user to the image forming apparatus,
wherein the image forming apparatus includes
an input section through which each of the first users who pick up printed output from the image forming apparatus inputs a first item of information indicative of that first user,
a receiving buffer that stores the print data received from the host terminal apparatus, and
a watermark embedding section that can produce a plurality of watermark patterns, each of the plurality of watermark patterns corresponding to a respective one of the first items of information and containing information representative of that first item of information, the watermark embedding section combining the print data with one of the plurality of watermark patterns, and
a display unit configured to display, to each first user whose first item of information has been input through the input section, that the watermark pattern with the first item on information indicative of that first user will be added to the printed output,
wherein upon reception of a print command after the warning has been displayed, the image forming apparatus prints out the received print data with one of the plurality of watermark patterns embedded therein.

2. The printing system according to claim 1 further comprising an administrator notifying section configured to send information to an administrator of the image forming apparatus;
wherein if, in response to the warning, said one of the first users decides that the print data should not be printed after the warning has been displayed, the administrator notifying section notifies the administrator of at least the first item of information.

3. The printing system according to claim 1, wherein the print data includes a third item of information indicative of whether the print data should be printed with the watermark pattern embedded therein;
wherein the image forming apparatus detects the third item of information from the received print data, and makes a decision to determine whether the print data should be printed with the watermark pattern embedded therein.

4. An image forming apparatus, comprising:
an input section through which each of a plurality of first users who pick up printed output from the image forming apparatus inputs a first item of information indicative of that first user;
a receiving buffer that stores print data received from a second user via an external host terminal apparatus;
a watermark embedding section that can produce a plurality of watermark patterns, each of the plurality of watermark patterns corresponding to a respective one of the first items of information and containing information representative of that first item of information, the watermark embedding section combining the print data with one of the plurality of watermark patterns; and
a display unit configured to display, to each first user whose first item of information has been input through the input section, a warning that the first item of information indicative of that first user will be added to the printed output,
wherein upon receipt of the print command after the warning has been displayed, the image forming apparatus prints out the received print data with one of the watermark patterns embedded therein.

5. The image forming apparatus according to claim 4, further comprising an administrator notifying section configured to send information to an administrator of the image forming apparatus;
wherein if, in response to the warning, said one of the first users decides that the print data should not be printed after the warning has been displayed, the administrator notifying section notifies the administrator of at least the first item of information.

6. The image forming apparatus according to claim 4, wherein the print data includes a third item of information indicative of whether the print data should be printed with the watermark pattern embedded therein, and
wherein the image forming apparatus detects the third item of information from the received print data, and makes a decision to determine whether the print data should be printed with the watermark pattern embedded therein.

7. An image forming apparatus, comprising:
an input section which receives identifying information that identifies a person who picks up a printed output from the image forming apparatus;
a receiving buffer that stores print data;
a watermark embedding section that combines a watermark pattern corresponding to the identifying information with the print data;
a display unit configured to display, to each person whose identifying information has been received by the input section, a warning that the identifying information of that person will be added to the printed output,
wherein upon reception of a print command after the warning has been displayed, the image forming apparatus prints out the print data with the watermark pattern embedded therein, thus permitting the person who picked up the printed output from the image forming apparatus to be identified from the printed output.

8. The image forming apparatus according to claim 7, wherein the person who picks up the printed output from the image forming apparatus is a first person, wherein the print data that is stored in the receiving buffer was sent via a network to the image forming apparatus by a second person, wherein the print data that is sent via the network additionally includes further identifying information that identifies the second person.

9. The image forming apparatus according to claim 8, further comprising an administrator notifying section that notifies an administrator if, in response to the warning, the first person decides that the print data should not be printed.

10. The image forming apparatus according to claim 7, wherein the input section comprises a card reader that reads the identifying information from a card carried by the person.

\* \* \* \* \*